(12) United States Patent
Pagano et al.

(10) Patent No.: US 9,403,233 B2
(45) Date of Patent: Aug. 2, 2016

(54) DC ELECTRODE NEGATIVE ROTATING ARC WELDING METHOD AND SYSTEM

(71) Applicant: Illinois Tool Works Inc., Glenview, IL (US)

(72) Inventors: Kevin Pagano, Algonquin, IL (US); James Lee Uecker, Appleton, WI (US); Steven Barhorst, Sidney, OH (US); Bryan Dustin Marschke, Kimberly, WI (US); Mario Amata, Dublin, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 331 days.

(21) Appl. No.: 13/681,687

(22) Filed: Nov. 20, 2012

(65) Prior Publication Data

US 2013/0153557 A1 Jun. 20, 2013

Related U.S. Application Data

(60) Provisional application No. 61/576,850, filed on Dec. 16, 2011.

(51) Int. Cl.
*B23K 35/368* (2006.01)
*B23K 9/12* (2006.01)
(Continued)

(52) U.S. Cl.
CPC ............. *B23K 9/12* (2013.01); *B23K 9/0216* (2013.01); *B23K 9/09* (2013.01); *B23K 9/173* (2013.01); *B23K 35/368* (2013.01); *B23K 35/3611* (2013.01)

(58) Field of Classification Search
CPC .......... B23K 9/12; B23K 9/0216; B23K 9/09; B23K 9/173; B23K 35/3611; B23K 35/368
USPC ............... 219/121.11, 130.1, 130.21, 130.31, 219/137.2, 137 WM
See application file for complete search history.

(56) References Cited

U.S. PATENT DOCUMENTS 3,818,176 A 6/1974 Brown
4,356,378 A 10/1982 Cloos
(Continued)

FOREIGN PATENT DOCUMENTS

CN 1212215 7/2005
DE 4315780 11/1994
(Continued)

OTHER PUBLICATIONS

Steve Barhorst: "Metal cored electrode basics", The American Welder, Dec. 31, 2000, p. 1, XP002685315, American Welding Society Retrieved from the Internet: URL:http://www.aws.org/wj/amwelder/11-00/barhorst.html [retrieved on Oct. 16, 2012].
(Continued)

*Primary Examiner* — Brian Jennison
(74) *Attorney, Agent, or Firm* — Fletcher Yoder P.C.

(57) ABSTRACT

A welding operation is performed by moving or rotating an arc in a welding torch, and feeding a metal cored wire through the torch in a direct current, electrode negative welding process. The electrode may include one or more arc stabilizers. The welding process may be pulsed or non-pulsed. Moreover, the process may be used with a number of different base metals intended to be welded, such as thin plate, galvanized metals, painted metals, coated metals, and so forth.

19 Claims, 2 Drawing Sheets

(51) Int. Cl.
*B23K 9/02* (2006.01)
*B23K 9/173* (2006.01)
*B23K 9/09* (2006.01)
*B23K 35/36* (2006.01)

(56) References Cited

U.S. PATENT DOCUMENTS

| | | | |
|---|---|---|---|
| 4,441,011 A * | 4/1984 | Nomura et al. | 219/124.34 |
| 4,621,185 A | 11/1986 | Brown | |
| 4,704,513 A | 11/1987 | Sugitani | |
| 4,717,807 A | 1/1988 | Parks | |
| 4,835,360 A | 5/1989 | Parks | |
| 4,897,523 A | 1/1990 | Parks | |
| 4,954,691 A | 9/1990 | Parks | |
| 4,999,478 A | 3/1991 | Bushey | |
| 5,030,812 A | 7/1991 | Sugitani | |
| 5,040,125 A | 8/1991 | Okumura | |
| 5,864,115 A | 1/1999 | Ikeda | |
| 5,938,955 A | 8/1999 | Ikeda | |
| 5,961,863 A | 10/1999 | Stava | |
| 5,981,906 A | 11/1999 | Parker | |
| 6,002,104 A | 12/1999 | Hsu | |
| 6,051,810 A | 4/2000 | Stava | |
| 6,093,906 A | 7/2000 | Nicholson | |
| 6,172,333 B1 | 1/2001 | Stava | |
| 6,204,478 B1 | 3/2001 | Nicholson | |
| 6,215,100 B1 | 4/2001 | Stava | |
| 6,267,291 B1 | 7/2001 | Blankenship | |
| 6,441,342 B1 | 8/2002 | Hsu | |
| 6,501,049 B2 | 12/2002 | Stava | |
| 6,510,984 B2 | 1/2003 | Blankenship | |
| 6,536,660 B2 | 3/2003 | Blankenship | |
| 6,708,877 B2 | 3/2004 | Blankenship | |
| 6,723,954 B2 * | 4/2004 | Nikodym et al. | 219/130.1 |
| 6,730,875 B2 | 5/2004 | Hsu | |
| 6,909,066 B2 | 6/2005 | Zheng | |
| 6,942,139 B2 | 9/2005 | Lipnevicius | |
| 7,032,814 B2 | 4/2006 | Blankenship | |
| 7,067,767 B2 | 6/2006 | Hsu | |
| 7,109,439 B2 | 9/2006 | Stava | |
| 7,304,269 B2 | 12/2007 | Fulmer | |
| 7,397,015 B2 | 7/2008 | Peters | |
| 7,683,290 B2 | 3/2010 | Daniel | |
| 8,203,099 B2 | 6/2012 | Peters | |
| 8,283,598 B2 | 10/2012 | Fulmer | |
| 8,373,093 B2 | 2/2013 | Peters | |
| 8,410,398 B2 | 4/2013 | Daniel | |
| 8,445,816 B2 | 5/2013 | Cole | |
| 2003/0116548 A1 * | 6/2003 | Blankenship | 219/130.1 |
| 2004/0026396 A1 * | 2/2004 | Nikodym | 219/137 WM |
| 2005/0103766 A1 | 5/2005 | Iizuka | |
| 2005/0224480 A1 | 10/2005 | Lipnevicius | |
| 2008/0041834 A1 | 2/2008 | Nishimura | |
| 2008/0053978 A1 | 3/2008 | Peters | |
| 2008/0245774 A1 | 10/2008 | Kim | |
| 2009/0045172 A1 | 2/2009 | VanErk | |
| 2009/0321402 A1 | 12/2009 | Doyle | |
| 2010/0176104 A1 | 7/2010 | Peters | |
| 2010/0301029 A1 | 12/2010 | Meckler | |
| 2011/0155710 A1 | 6/2011 | Farah | |
| 2011/0297658 A1 | 12/2011 | Peters | |
| 2012/0061364 A1 | 3/2012 | Purslow | |
| 2012/0097655 A1 | 4/2012 | Daniel | |
| 2012/0097656 A1 | 4/2012 | Peters | |
| 2012/0152920 A1 | 6/2012 | Enyedy | |
| 2012/0152921 A1 | 6/2012 | Peters | |
| 2013/0001210 A1 | 1/2013 | Pagano | |
| 2013/0015170 A1 | 1/2013 | Peters | |
| 2013/0043219 A1 | 2/2013 | Peters | |
| 2013/0092667 A1 | 4/2013 | Peters | |
| 2013/0112675 A1 | 5/2013 | Peters | |
| 2013/0175247 A1 | 7/2013 | Peters | |
| 2013/0193124 A1 | 8/2013 | Peters | |
| 2013/0213948 A1 | 8/2013 | Peters | |
| 2013/0228555 A1 | 9/2013 | Peters | |
| 2013/0264323 A1 | 10/2013 | Daniel | |

FOREIGN PATENT DOCUMENTS

| | | |
|---|---|---|
| EP | 0076498 | 4/1983 |
| EP | 0278620 | 8/1988 |
| EP | 0402648 | 12/1990 |
| EP | 0824985 | 2/1998 |
| EP | 1710043 | 10/2006 |
| EP | 1733838 | 12/2006 |
| JP | S58107271 | 6/1983 |
| JP | S59101280 | 6/1984 |
| JP | S1071580 | 3/1989 |
| JP | H0191965 | 4/1989 |
| JP | H0191966 | 4/1989 |
| JP | 3018474 | 1/1991 |
| JP | 4187380 | 7/1992 |
| JP | 4200866 | 7/1992 |
| JP | 0523856 | 2/1993 |
| JP | H2050023856 | 2/1993 |
| JP | H05309476 | 11/1993 |
| JP | 0866771 | 3/1996 |
| JP | H0866771 | 3/1996 |
| JP | 9094658 | 4/1997 |
| JP | H09300072 | 11/1997 |
| JP | 106004 | 1/1998 |
| JP | H106004 | 1/1998 |
| JP | 10052754 | 2/1998 |
| JP | H11239878 | 9/1999 |
| JP | 2000301332 | 10/2000 |
| JP | 2001259838 | 9/2001 |
| JP | 2002239733 | 8/2002 |
| JP | 2002316264 | 10/2002 |
| JP | 2010253533 | 11/2010 |
| WO | 2012076750 | 6/2012 |
| WO | 2013045214 | 4/2013 |

OTHER PUBLICATIONS

International Search Report from PCT application No. PCT/US2012/044466 dated Nov. 5, 2012, 11 pgs.

Iwata, Shinji, Murayama, Masatoshi, and Kojima, Yuji; "Application of Narrow Gap Welding Process with High Speed Rotating Arc to Box Column Joints of Heavy Thick Plates," JFE Technical Report, No. 14, Dec. 2009, pp. 16-21.

Sugitani, Y, Kobayashi, Y, and Murayama, M, "Development and application of automatic high speed rotation and arc welding," Welding International, 5 (7), pp. 577-583, 1991.

International Search Report from PCT application No. PCT/US2012/069378 dated Apr. 2, 2013, 15 pgs.

International Search Report from PCT application No. PCT/US2013/052356 dated Dec. 2, 2013, 15 pgs.

International Search Report from PCT application No. PCT/US2014/055090, dated, Dec. 18, 2014, 9 pgs.

International Search Report from PCT application No. PCT/US2014/055094, dated Apr. 30, 2015, 14 pgs.

* cited by examiner

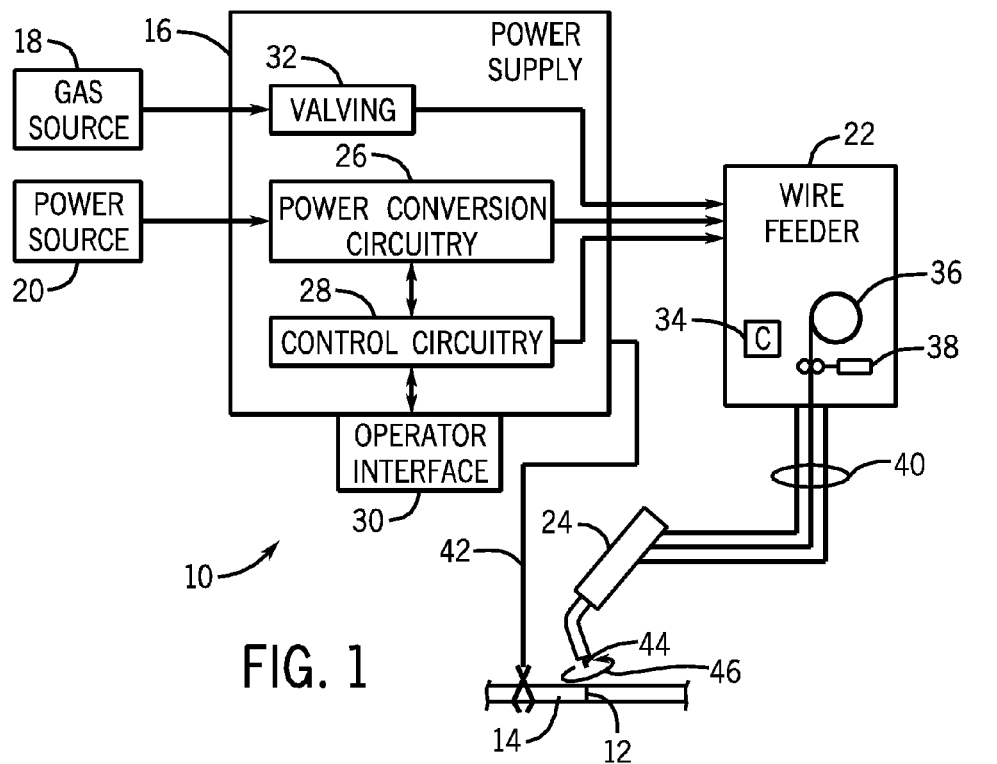
FIG. 1
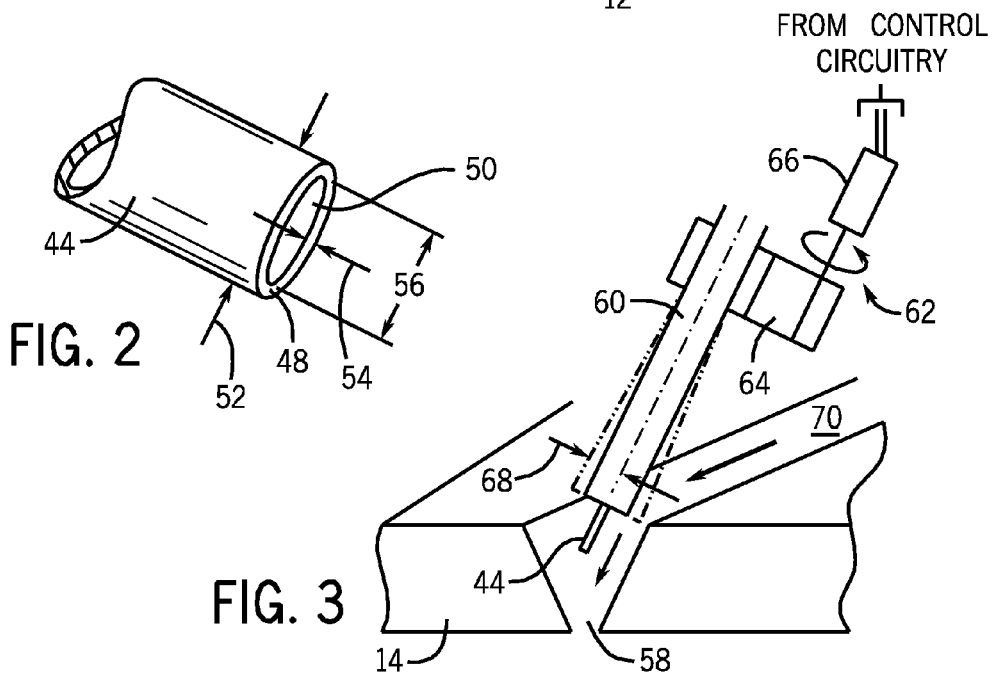
FIG. 2
FIG. 3

DC ELECTRODE NEGATIVE ROTATING ARC WELDING METHOD AND SYSTEM

CROSS REFERENCE TO RELATED APPLICATIONS

This application is a Non-provisional U.S. patent application of U.S. Provisional Application No. 61/576,850, entitled "DC Electrode Negative Rotating Arc Welding Method and System, filed Dec. 16, 2011, which is herein incorporated by reference.

BACKGROUND

The invention relates generally to welding techniques, and more particularly to improved processes for utilizing metal cored welding wire electrodes for enhanced performance, particularly in automated welding applications. The present disclosure is related to a previously filed provisional application 61/503,955, entitled Metal Cored Welding Method and System, filed by Summers et al. on Jul. 1, 2011, which is hereby incorporated into the present disclosure by reference.

A range of techniques have been developed for joining workpieces by welding operations. These include diverse processes and materials, with most modern processes involving arcs developed between a consumable or non-consumable electrode and the workpieces. The processes are often grouped in such categories as constant current processes, constant voltage processes, pulsed processes, and so forth. However, further divisions between these are common, particularly in processes that consume an electrode to add filler metal to the weld. In virtually all such cases, the process selected is highly linked to the filler material and its form, with certain processes exclusively utilizing a particular type of electrode. For example, certain types of metal inert gas (MIG) welding processes, which form part of larger groups sometimes referred to as gas metal arc welding (GMAW) and flux cored arc welding (FCAW).

In GMAW welding, an electrode in the form of a wire is consumed by the progressing weld pool, melted by the heat of an arc between the electrode wire and the workpiece. The wire is continuously fed from a spool through welding gun where a charge is imparted to the wire to create the arc. The electrode configurations used in these processes are often referred to as either solid, flux cored, or metal cored wire. Each type is considered to have distinct advantages and disadvantages over the others, and careful adjustments to the welding process and weld settings may be required to optimize their performance. For example, solid wire, while less expensive than the other types, is typically used with inert shielding gases, which can be relatively expensive. Flux cored wires may not require separate shielding gas feeds, but are more expensive than solid wires. Metal cored wires do require shielding gas, but these may be adjusted to mixes that are sometimes less expensive than those required for solid wires. Although metal cored wires offer distinct advantages over the other electrode types, their adoption has not been as widespread as solid wires.

All three of these electrode types may be used with different transfer modes, referring to the mechanical and electro-mechanical phenomena of moving metal from the electrode tip to the progressing weld bead. A number of such transfer modes exist, such as short circuit transfer, globular transfer, spray transfer, and pulsed spray transfer. In practice, transfer physics may appear as a hybrid of these, and the actual material transfer may transition between them during welding, although the process and electrode are often selected to maintain a certain transfer mode.

While it has long been realized that metal cored wire electrodes offer benefits that are advantageous over their solid and flux cored counterparts for many reasons, improvements in processes are needed that can enhance their performance and adoption.

BRIEF DESCRIPTION

The present disclosure summarizes newly developed combinations of processes and metal cored wire electrodes designed to fulfill these needs. The processes involved rely on spinning or reciprocating the arc, sometimes referred to as "spin-arc", typically by moving the electrode tip, and utilizing a metal cored wire electrode. Quite unexpectedly, the use of forced arc movement and certain types of metal cored wires, in conjunction with particular processes (e.g., direct current, electrode negative (DCEN) polarity welding) is believed to provide very substantial improvements not obtainable or predictable based on previously known uses of spin-arc technologies or metal cored wire welding technologies. It is further believed that arc characteristics, weld pool characteristics, temperature distribution, heat input to the workpiece, and penetration characteristics are unique to the synergy of the forced arc movement and metal cored wires. Further enhancements can be made through adjustments in such factors as the process parameters, the size and type of metal cored wire, the frequency, amount of, and pattern of movement, and so forth.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of an exemplary welding system utilizing aspects of the present techniques;

FIG. 2 is a detailed view of an end portion of a metal cored electrode for use with the system of FIG. 1;

FIG. 3 is a diagrammatical view representing movement of the metal cored electrode in accordance with aspects of the present techniques;

Figure 6:
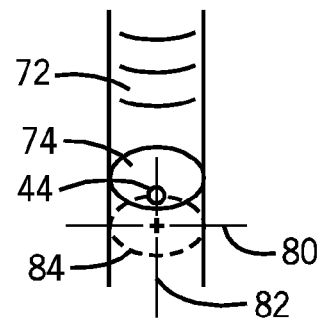
Figure 7:
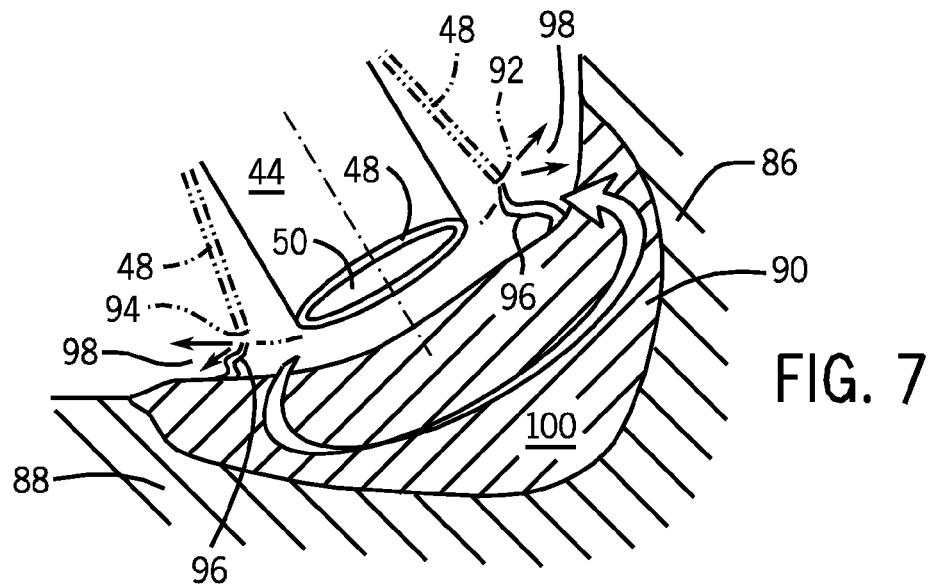
Figure 8:
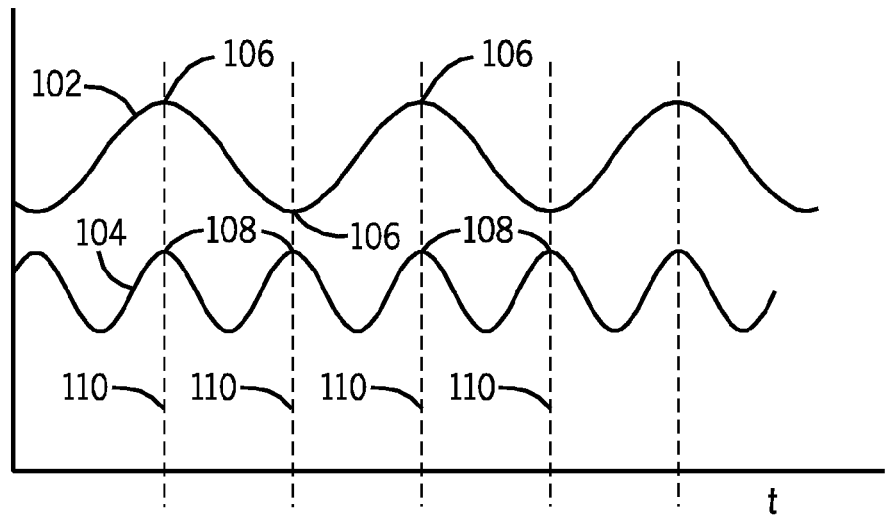

FIG. 6 is a further illustration of a progressing weld bead utilizing a differently oriented elliptical path for a metal cored welding wire; and FIG. 7 is a illustration of an exemplary arc location and transfer mode for a progressing weld bead utilizing a moving metal cored welding wire electrode; and FIG. 8 is a timing diagram illustrating movement of a metal cored welding electrode together with an exemplary forced transfer trace.

DETAILED DESCRIPTION

FIG. 1 illustrates an exemplary welding system 10 utilizing movement of a metal cored welding wire electrode 44. The system 10 is designed to produce a weld 12 on a workpiece 14. The weld may be oriented in any desired manner, including butt weld, lap weld, angled welds, out-of-position welds, and so forth. The system includes a power supply 16 that will typically be coupled to a gas source 18 and to a power source 20, such as the power grid. Other power sources, of course, include generators, engine-driven power packs, and so forth. A wire feeder 22 is coupled to the power source 20 and supplies metal cored welding wire to a welding gun 24. As described in detail below, the metal cored welding wire is forced to move during creation of a weld bead, causing movement of an arc between the metal cored welding wire 44 and the workpiece 14, and particularly between a sheath of the electrode and the workpiece.

In the illustrated embodiment, the power supply 16 will include power conversion circuitry 26 coupled to control circuitry 28 that regulates operation of the power conversion circuitry to produce power output suitable for the welding operation. The power supply may be designed and programmed to produce output power in accordance with a number of processes, welding regimes, and so forth, including constant current processes, constant voltage processes, pulsed processes, short circuit transfer processes, and so forth. In a presently contemplated embodiment, the control circuitry 28 controls the power conversion 26 to produce a DCEN (sometimes referred to as a "straight") polarity welding regime that aids in the transfer of material from the metal cored welding wire to a progressing weld pool. However, other welding regimes may of course be used. An operator interface 30 allows a welding operator to alter both the welding process and the process settings. Moreover, in certain contemplated embodiments the operator interface may allow selection modification of certain parameters related to movement of the welding gun and the metal cored welding wire. Finally, the power supply may include valving 32 for regulating the flow of shielding gas from the gas source 18.

The wire feeder 22 will typically include control circuitry, illustrated generally by reference numeral 34, which regulates the feed of welding wire from a spool 36. The spool 36 will contain a length of metal cored welding wire that is consumed during the welding operation. The welding wire is advanced by a drive assembly 38, typically through the use of a small electric motor under the control of the control circuitry 34. Welding wire, gas, and control and feedback data may be exchanged between the wire feeder 22 and the welding gun 44 via a weld cable 40. The workpiece 14 is also coupled to the power supply 16 by a work cable 42 to complete an electrical circuit through the electrode 44 when an electric arc is established between the electrode 44 and the workpiece 14. As described more fully below, the electrode 44 advancing from the welding gun 24 is forced to move, such as in a rotary motion as indicated by reference numeral 46.

The welding system illustrated in FIG. 1 may be designed for manual operation, although many of the applications for the present techniques will be automated. That is, the welding gun 24 will be secured to a robot which is programmed to position the welding torch at desired locations with respect to a workpiece. The technique may be used with other control approaches as well, such as fixed automation applications. The robot may then act to initiate arcs between the electrode and the workpiece, and properly orient the welding gun and advance the welding gun along a predefined path where a weld bead is to be established to join two components. As described more fully below, in such automation applications, the present techniques allow for greatly enhanced travel speeds and improved weld bead characteristics.

The present techniques are designed specifically for use with metal cored welding wires of the type illustrated in FIG. 2. Such welding wires generally comprise a sheath 48 made of metal wrapped around one or more metal cores 50. Various techniques are known for producing such metal cored welding wires, and are beyond the scope of the present invention. The characteristics of the metal cored welding wire may be selected for a particular application, particularly depending upon the metallurgy of the components to be joined, the type of shielding gas to be used, the anticipated fill volumes of the weld bead, and so forth. In the illustrated embodiment, certain geometries of the metal cored welding wire may assist in enhancing the benefits of the electrode movement. For example, the welding wire will typically be selected to have a desired diameter 52. The diameter comprises a sheath wall thickness 54 and a core diameter 56. These parameters may be altered and optimized to enhance the performance of the welding wire and to provide such characteristics as improved arc establishment, arc maintenance, material transfer, metallurgy of the resulting weld bead, weld bead penetration, and so forth.

In a presently contemplated embodiment, specific wires may be selected for use with DCEN polarity welding regimes. As discussed more fully below, for example, it has been found that the combination of "spin-arc" movement with DCEN polarity processes and wires such as wires comprising stabilizers, and other components, such as manganese (e.g., AWS E5.18 70C-6; and more generally, E5.18 XXC-6, where "XX" denotes tensile strength) provide excellent results. One such wire is commercially available under the name Metalloy® X-Cel™ from Hobart Brothers of Troy, Ohio. Still further, certain formulations of welding wire are believed to provide benefits beyond those obtainable with other wires. Such formulations are described in U.S. Pat. No. 6,723,954, entitled Straight Polarity Metal Cored Wire, issued to Nikodym et al. on Apr. 20, 2004; U.S. Pat. No. 7,087,860, entitled Straight Polarity Metal Cored Wire, issued to Nikodym et al. on Aug. 8, 2006; and U.S. Pat. No. 7,863,538, entitled Metal-Core Gas Metal Arc Welding of Ferrous Steels with Noble Gas Shielding, issued to Barhorst et al. on Jan. 4, 2011, which are all hereby incorporated into the present disclosure by reference. Moreover, certain composition modifications may be made so such wires to enhance their performance in DCEN polarity processes with forced movement of the arc, as discussed below.

FIG. 3 illustrates movement of the welding wire in a typical application. As shown in FIG. 3 a joint 58 is to be formed between workpieces, and with the electrode 44 extending from the welding torch that is positioned in close vicinity to the intended joint. An arc is then established between the electrode and the underlying metal to be joined. The electrode emanates from a contact element 60 which can be moved to force motion of the electrode and the established arc. For movement of the contact element, a motion control assembly 62 is provided in the welding gun. Although numerous techniques may be utilized for forcing such motions, in a presently contemplated arrangement, a cam 64 is turned by a motor 66 which itself is controlled and powered by the control circuitry of the system. The contact element and electrode are thus forced to move in a predefined pattern and at a predefined frequency as determined by the geometry and control of the motion control assembly 62. As illustrated in FIG. 3, the tip of the contact element 60, and thus the electrode 44 may be moved a predetermined distance or radius 68 from the center line of the contact element 60. As described below, various patterns may be utilized for this motion. The electrode 44 is advanced during this process to form the desired weld bead. Moreover, the entire assembly is moved at a desired travel speed as indicated by reference numeral 70. As described below, the integration of electrode movement with metal cored welding wire may greatly enhance the quality of the resulting weld bead, and permit much higher travel speed than can be obtained through electrode motion alone or the use of metal cored welding wires alone.

Figure 4:
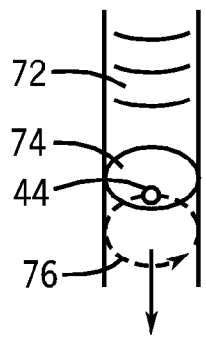
FIG. 4 is a diagrammatical representation of a progressing weld bead utilizing a circular pattern for movement of a metal cored welding wire.

FIG. 4 illustrates an exemplary progressing weld bead 72 along with certain patterns of motion of the electrode 44. As will be appreciated by those skilled in the art, the weld bead progresses behind a weld pool or puddle 74 comprised of molten metal resulting from the heating of the electrode and the surrounding base metal of the workpiece. The electrode in the illustration of FIG. 4 is moved in a generally circular pattern as indicated by reference numeral 76. It is presently contemplated that such motion may be coordinated with the travel speed of the welding gun such that the electrode will be sufficiently close to the weld pool 74 and peripheral regions of the workpiece to maintain the arc and to move the arc between these regions, maintaining the weld pool while heating the electrode and surrounding metal. As described below, it is also contemplated that other coordinating factors may be employed, such as wire feed speeds, rates or frequencies of movement of the electrode, pulse frequencies or DC parameters for the welding process (e.g., currents and voltages applied to create the arc) and so forth.

Figure 5:
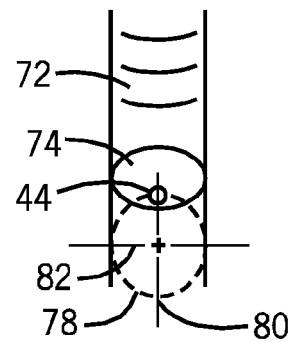
FIG. 5 is a similar illustration of a progressing weld bead utilizing a an elliptical path for a metal cored welding wire.

FIG. 5 illustrates a further possible pattern for movement of the electrode, in this case a generally elliptical pattern 78. The ellipse in this case has a major axis 80 along the direction of travel of the weld and torch and a minor axis 82 transverse to the direction of travel. Moreover, FIG. 6 illustrates a further possible pattern, namely a transverse elliptical pattern 84 in which a major axis 80 of the elliptical movement is transverse to the direction of travel of the weld and torch. It should be noted, however, any desired pattern may be utilized, and the motion control assembly may be adapted to implement these patterns, among others. For example, patterns defining zigzags, figure 8's, transverse reciprocating lines, and so forth may be used and optimized for particular welds.

FIG. 7 shows an exemplary deposition and penetration scheme believed to operate when a metal cored welding wire is utilized with forced motion. That is, the electrode 44 is moved between workpieces 86 and 88 to be joined. A weld bead 90 forms that penetrates into the workpieces and creates a generally flat surface as the weld bead advances. In the illustration of FIG. 7, reference numeral 94 refers to a maximum approach of the sheath 48 of the welding wire toward workpiece 86, while reference numeral 94 represents a minimum approach of the sheath 48 to the workpiece 88.

It is believed that the arc established between the metal cored welding wire and the workpieces and/or the progressing weld puddle exists only between the sheath 48 and these elements, although other locations may be involved in or sustain the arc. Accordingly, unique transfer locations are established as indicated by reference numeral 96, as the material is spun out from the electrode, as indicated by arrows 98. It has been observed that resulting welds are flatter than similar welds that may be established by electrode motion using solid wire electrodes. Moreover, it is believed that enhanced penetration into the base materials is obtained as indicated by reference numeral 100.

A number of benefits are believed to flow from the use of controlled, patterned movement with a metal cored welding wire. For example, higher deposition rates are possible with substantial increases in travel speeds, on the order of 50 to 100 percent higher than obtainable with either technique used alone. Moreover, better gap bridging is available with less aggressive arcs. The welds also exhibit better wetting, lower spatter, and less undercut. As mentioned above, weld beads also appear to be flatter and less bulbous then spin-arc technique used with solid welding wires.

Parameters that may be varied in the technique may include factors such as the rate of movement of the electrode, and the degree of movement of the electrode about a normal or central position. In particular, while the invention is certainly not limited to a circular pattern, where circular patterns have been used, it is believed that rates of rotation higher than 50 Hz, and extending to 100-120 Hz and higher may be desirable, obtaining flatter weld beads and higher deposition rates. Moreover, diameters of rotation are presently contemplated on the order of 1.5 mm, but higher diameters, such as on the order of 2 mm, and up to 3 to 4 mm and beyond may be desired. Moreover, it may be desirable to coordinate and synchronize the movement (e.g., rotation) of the metal cored electrode with a pulsed waveform, with wire feed speeds, and so forth. It may also be desirable to provide electrode movement that is synchronized or coordinated with gas flow. These various parameters may assist in the penetration into the base materials, the deposition of the electrode material, the maintenance of the arc, as well as other welding parameters.

It is also believed that the weld pool may move better with movement of the metal cored electrode, possibly due to mechanical forces (e.g., centrifugal forces) imparted on the molten ball or spray that develops at the electrode tip. The process may thus be able to run cooler than previous processes. Enhanced benefits may be offered as well on certain types of workpieces and workpiece metallurgies, particularly galvanized workpieces. Furthermore, the process may allow for less expensive shielding gasses, such as $CO_2$ rather than Argon mixes are currently used with such welding electrodes.

FIG. 8 illustrates an exemplary timing diagram relating movement of the metal cored welding electrode with forced transfer of material from the electrode tip. In diagram of FIG. 8, electrode tip movement is indicated by trace 102 over time, while forced transfer is indicated by trace 104. In a circular movement pattern, a generally sinusoidal motion will be expected from the point of view of any particular point in the advancing weld bead or, the puddle, or any particular location of the joint. At points 106 in this motion, the sheath of the electrode may most closely approach the sides of the base materials of the workpiece. The welding process may be adapted, such as by control of pulsed welding regimes, to force or enhance transfer of material from the electrode at these locations, as indicated generally by reference numeral 108. These times will typically occur periodically as indicated by times 110. These and many other control regimes may be envisaged as described above for coordinating transfer modes with motion of the metal cored welding electrode, particularly making use of the establishment of the arc with the sheath of the electrode only.

The foregoing technique has been tested with a welding torch comprising a servo motor and a cam to rotate the contact tip in a 2.0 mm oscillation at what is believed to be approximately 60 Hz. Contact tips of 45 mm in length were employed. A welding electrode of 0.045 inches in diameter was employed, the electrode type being ER70-S6 solid wire. A 90-10 $CO_2$ shielding gas mixture was utilized. A pulse welding regime was utilized based upon the Auto Access power supply running an Accu-Pulse process available from Miller Electric Mfg. of Appleton, Wis. This base line test was run at 39 inches per minute, a speed optimized for a quality fillet weld on 12 gauge material. Based upon these settings, travel speed was increased to 59 inches per minute, approximately 50% above the base line. Test conditions were varied in the attempt to optimize welding results. Limiting factors appeared to be undercut. Regardless of the welding parameters, high ropey beads and undercut remain.

In a second test, the same welding wire and gas were used with the same welding power supply and welding process. In this test electrode movement was utilized, however, as described above. The travel speed for this second test was set at 59 inches per minute. Test conditions were varied in an attempt to optimize the welding results. A tight driving arc appeared to dig deep into the base metal and created a cavitation affect. The electrode movement process reduced the amount of undercut and significantly flattened the face of the weld. However, the weld puddle did not appear to push-out to the toes of the weld, ultimately leaving some undercut present.

In a third test, an E70C-6M Metalloy® Vantage™ and Matrix™ metal cored welding wire of 0.045 inches diameter was utilized (available commercially from Hobart Brothers of Troy, Ohio). The welding gas mixture was identical to the previous tests, as were the power supply and welding process. In this test with the metal cored welding wire, electrode movement was used again with a 59 inches per minute travel speed setting. Test conditions were varied in an attempt to optimize the welding results. The arc generated with the metal cored wire was significantly softer than in the case of the solid wire. The reduction in cavitations allowed the weld puddle to fill much better in the toes, nearly eliminating all undercut at 59 inches per minute. The weld leg size was equal to the material thickness (0.125 inches). While it is believed that the correct weld size for the material, the automotive industry over-welds such materials to compensate for variations in part fit-up and to facilitate visual inspection.

In a fourth test, the same metal cored welding wire was utilized, but in a 0.052 diameter. The same gas mixture, power supply and welding process were utilized, again with electrode movement. The test was run again at 59 inches per minute travel speed. Here again, test conditions were varied in an attempt optimize the welding results. The arc generated with the metal cored wire was significantly softer than the case of solid wires. The reduction in the cavitations allowed the weld puddle to fill much better at the toes, nearly eliminating all undercut at 59 inches per minute. The weld leg size improved with a larger bead width. In this test, the robustness of the process was tested by moving the wire out of the joint by approximately 1.2 mm both high and low. The weld was also tested with 1.2 mm gap. Welding results show the process to have a very robust window even at 59 inches per minute travel speeds.

A further test was run with the same metal cored welding wires in the previous test, the same gas mixture, the same power supply and welding process. In this test a higher travel speed of 80 inches per minute was used on a horizontal lap joint. Test conditions were again varied to optimize the welding results. The arc generated with the metal cored wire was significantly softer than the solid wire. The robustness of the process was tested with a gap varying from 0-1.2 mm and back. Welding results show the process to have a very robust window even at 80 inches per minute travel speeds. The amount of spatter generated on all metal cored electrode tests was significantly less than the amounts seen with traditional solid wire applications on similar joints.

In addition to the foregoing examples, it has been found that a welding procedure that uses DCEN polarity with the metal cored wired discussed above, with mechanical movement of the arc, may provide particularly good results, and may be even more attractive on certain types of workpieces (or baseplate materials). For example, the Metalloy® X-Cel™ wire mentioned above is particularly well suited to reduce spatter, while enhancing weld metal wetting (avoiding overly "crowned" beads). The use of a DCEN process, moreover, with arc movement and in combination with such wires, reduces overheating. The combination may be particularly useful for galvanized sheet material welding (e.g., in automotive applications), for coated or painted material welding, for thin steel welding (e.g., in furniture manufacturing), and so forth.

It is currently believed that welding wires suitable for these applications (corresponding generally to the X-Cel™ wire mentioned) are characterized by components that stabilize the arc (producing stable arcs with reduced spatter). For example, such stabilizers may include potassium and compounds that contribute potassium during the welding process (such as potassium feldspar, potassium titanate, potassium manganese-titanate, potassium sulfate, potassium carbonate, potassium phosphate, potassium molybdate, potassium nitrate, potassium fluosilicate, and complex oxide compounds containing potassium). Moreover, graphitic and non-graphitic carbon sources may provide stabilization by sublimating into the arc column and by rendering finer droplet metal transfer. Possible modification of existing welding wires (such as those mentioned) could include potassium from any other or more sources noted above, and a suitable carbon source, such as graphite or carbon containing iron and/or alloy powders.

Regarding the particular DCEN processes involved, these will typically be performed at currents and voltages selected based at least in part on the electrode diameter, the electrode extension (e.g., contact tip to plate), the welding position, the workpiece or base plate type and diameter, the travel speed and deposition rates, the wire feed speed, and so forth. For example, voltages ranging from 21 to 30 Volts may be suitable, with currents ranging from 150 to 450 Amps. Moreover, regarding shielding gases, appropriate gas mixes are believed to include argon and carbon dioxide, with a minimum of 75% and a maximum of 95% argon (although other amounts and combinations may be satisfactory, such as 98% argon, 2% oxygen). Still further, it is contemplated that the DCEN polarity selected may include non-pulsed and pulsed current.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding method comprising:
    establishing an arc between a metal cored welding electrode and a workpiece in a direct current, electrode negative welding polarity, the metal cored welding electrode comprising a sheath and a core;
    feeding the electrode from a welding torch while cyclically moving the electrode in a desired pattern by a motion control assembly within the welding torch to maintain an arc between at least the sheath and the workpiece; and
    advancing the welding torch or the workpiece to establish a weld bead.

2. The method of claim 1, wherein the welding electrode comprises at least one arc stabilizer acting as a source of potassium and carbon.

3. The method of claim 2, wherein at least one arc stabilizer comprises at least one of potassium and compounds that contribute potassium during the welding process, potassium feldspar, potassium titanate, potassium manganite-titanate, potassium sulfate, potassium carbonate, potassium phosphate, potassium molybdate, potassium nitrate, potassium fluosilicate, complex oxide compounds containing potassium, graphitic and non-graphitic carbon sources.

4. The method of claim 3, wherein at least one hydrogen source comprises at least one of cellulose, sodium carboxymethyl-cellulose, methyl cellulose and organic compounds and inorganic compounds that contain hydrogen.

5. The method of claim 1, wherein the welding electrode conforms to AWS standard A5.18 EXXC-6.

6. The method of claim 1, wherein the workpiece comprises a galvanized material.

7. The method of claim 1, wherein the workpiece comprises a coated or painted material.

8. The method of claim 1, wherein weld power provided to the metal cored welding electrode comprises a pulsed welding regime.

9. The method of claim 1, wherein the welding torch or the workpiece is advanced at a rate of at least 23 inches per minute.

10. The method of claim 1, wherein the electrode is moved at a rate of between approximately 50 Hz and approximately 120 Hz.

11. A welding system comprising:
a power supply configured to provide power to establish an arc between a metal cored welding electrode and a workpiece in a direct current, electrode negative welding polarity, the metal cored welding electrode comprising a sheath and a core;
a wire feeder coupled to the power supply and configured to feed the electrode from a welding torch; and
a welding torch that in operation receives the electrode from the wire feeder while cyclically moving the electrode in a desired pattern by a motion control assembly within the welding torch to maintain an arc between the sheath and the workpiece.

12. The system of claim 11, wherein the welding electrode comprises at least one arc stabilizer acting as a source of potassium and carbon.

13. The system of claim 12, wherein at least one arc stabilizer comprises at least one of potassium and compounds that contribute potassium during the welding process, potassium feldspar, potassium titanate, potassium manganite-titanate, potassium sulfate, potassium carbonate, potassium phosphate, potassium molybdate, potassium nitrate, potassium fluosilicate, complex oxide compounds containing potassium, graphitic and non-graphitic carbon sources.

14. The system of claim 13, wherein at least one hydrogen source comprises at least one of cellulose, sodium carboxymethyl-cellulose, methyl cellulose and organic compounds and inorganic compounds that contain hydrogen.

15. The system of claim 11, wherein the welding electrode conforms to AWS standard A5.18 EXXC-6.

16. A welding method comprising:
providing welding power to establish an arc between a welding electrode and a workpiece in a direct current, electrode negative welding polarity, wherein the welding power comprises a pulsed welding regime;
feeding the electrode from a welding torch while cyclically moving the electrode in a desired pattern by a motion control assembly within the welding torch to maintain an arc between the electrode and the workpiece; and
advancing the welding torch or the workpiece to establish a weld bead.

17. The method of claim 16, wherein the electrode comprises a metal cored welding electrode comprising a sheath and a core.

18. The method of claim 17, wherein the arc is established between at least the sheath and the workpiece.

19. The method of claim 16, wherein the workpiece comprises a galvanized, coated, or painted material.

* * * * *